United States Patent
Cooper

(10) Patent No.: US 6,643,780 B1
(45) Date of Patent: Nov. 4, 2003

(54) MODEMS THAT BLOCK DATA TRANSFERS DURING SAFE MODE OF OPERATION AND RELATED METHODS

(75) Inventor: Gerald M. Cooper, Gretna, VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/307,363

(22) Filed: May 7, 1999

(51) Int. Cl.$^7$ .................. G06F 12/16; H04L 12/12; H04L 29/06
(52) U.S. Cl. ........................ 713/201; 713/200
(58) Field of Search ............... 713/200, 201; 370/352, 356; 379/219, 93.01, 93.05, 93.09, 93.28, 93.21

(56) References Cited

U.S. PATENT DOCUMENTS

| | | | | |
|---|---|---|---|---|
| 4,313,176 A | * | 1/1982 | Cecil | 379/93.05 |
| 4,680,773 A | | 7/1987 | Amundson | 375/8 |
| 5,790,806 A | | 8/1998 | Koperda | 395/200.82 |
| 5,896,497 A | * | 4/1999 | Halstead | 713/200 |
| 5,956,481 A | * | 9/1999 | Walsh et al. | 713/200 |
| 5,987,611 A | | 11/1999 | Freund | 713/201 |
| 5,999,526 A | * | 12/1999 | Garland et al. | 370/352 |
| 6,269,154 B1 | * | 7/2001 | Chellali et al. | 379/93.28 |

FOREIGN PATENT DOCUMENTS

| EP | 0366250 | 5/1990 |
|---|---|---|
| EP | 0859515 | 8/1998 |

OTHER PUBLICATIONS http://www.zonelabs.com/zonealarm/za_features.htm, Apr. 4, 2000, 2 pages.
Truevector™ technology white paper entitled "PC–Based Internet Traffic Monitoring," Apr. 4, 2000, 4 pages.
http://www.zonelabs.com/aboutus.htm, Apr. 4, 2000, 1 page.
http://www.zonelabs.com/pressdownloadzalm.htm, Apr. 4, 2000, 2 pages.
http://www.zonelabs.com/presspatent.htm, Jan. 17, 2000, 2 pages.
International Search Report, PCT/US00/10473, Sep. 13, 2000.

* cited by examiner

*Primary Examiner*—Ly V. Hua
(74) *Attorney, Agent, or Firm*—Myers Bigel Sibley & Sajovec, P.A.

(57) ABSTRACT

A cable modem blocks data transfers addressed to host systems during a safe mode of operation and provides the data transfers to the addressed host systems during a normal mode of operation. The cable modem can be coupled to multiple host systems which can be addressed separately. Accordingly, the safe mode of operation can be selected for a subset of the host systems coupled to the cable modem. The safe mode or normal mode of operation can be invoked by pushing a button on the cable modem. The safe mode of operation may also be invoked after the expiration of a timer which times an interval of inactivity at the host. The normal mode of operations can be invoked after detecting activity at the host system.

56 Claims, 2 Drawing Sheets

MODEMS THAT BLOCK DATA TRANSFERS DURING SAFE MODE OF OPERATION AND RELATED METHODS

FIELD OF THE INVENTION

The present invention relates to the field of communications in general and more particularly to cable modems and methods.

BACKGROUND OF THE INVENTION

With the rise in popularity of the Internet, many users are accessing the Internet through the Public Switched Telephone Network (PSTN) over a modem connected to a telephone line in the user's home. Unfortunately, the bandwidth provided by home telephone lines may prove to be inadequate for some applications on the Internet. For example, some data sets provided by the Internet may be so large that it is difficult to transfer the data set over the telephone line in a given time so that the application operates in a real-time manner. In particular, current residential telephone modem technology may be limited to data rates on the order of 56 kilobaud (kb).

In an attempt to reduce the bandwidth problem associated with the telephone lines described above, there have been efforts to provide Internet service over coaxial cables used to provide cable TV. Accordingly, the user may access the Internet over the cable system using a cable modem to provide data rates of 42 megabaud or higher. Accessing the Internet via a cable system may involve initializing the cable modem each time the cable modem is turned on, during which the cable modem may register with the cable system. For example, when the user wishes to access the Internet, the user may turn on the cable modem which then registers with the cable system.

As the number of cable modems handled by the cable system increases, the time needed to register each cable modem may also increase thereby lengthening the registration time. For example, if hundreds of cable modems are used in a cable system, the registration time for a selected cable modem may be several minutes. Consequently, the user may wish to avoid turning the cable modem off in an effort to avoid the delay incurred by a lengthy registration process. For example, if the user turns the cable modem on just prior to accessing the Internet, the user may need to wait for the registration process to complete before gaining access to the Internet. Moreover, cable systems may also provide television and telephone service to a user's home such as by routing these services through the cable modem to the television and telephone. Accordingly, the user may desire that the cable modem be left on so as not to interrupt telephone or television service.

Unfortunately, leaving the cable modem turned on may decrease the security of the computer to which the cable modem is attached. In particular, the computer may be more susceptible to attack via the cable. For example, an unauthorized user may attempt to gain access to the computer via the cable. Moreover, because the cable provides relatively high bandwidth, relatively simple attacks, such as trying a large number of password combinations, may require only a short time to be successful. In view of the above, there exists a need to improve the security of cable modems used to access the Internet via cable systems.

Accordingly, the present invention may allow improvement in the security of cable modems by blocking access to the cable modem from the cable system while the cable modem is in safe mode. Blocking data transfers may allow the subscriber to leave the host system connected to the cable modem, thereby possibly avoiding the delay associated with the registration process while reducing the security threats posed by maintaining a physical connection to the cable modem.

SUMMARY OF THE INVENTION

It is, therefore, an object of the present invention to allow improvement in cable modems and methods.

It is another object of the present invention to allow improvement in the security of able modems and methods.

These and other objects are provided by blocking data transfers from a cable system to a cable modem addressed to a host system coupled to the cable modem during a safe mode of operation and providing the data transferred from the cable system to the addressed host system during a normal mode of operation. Blocking the data transfers addressed to a host system during the safe mode of operation may improve the security of the cable modem. In particular, while the cable modem operates in the safe mode of operation, unauthorized users will not be able to gain access to the host system via the cable system. Moreover, other services provided via the cable modem can be available while the cable modem operates in the safe mode. For example, telephone or television services may be unaffected by the safe mode of operation. Subscribers may, therefore, leave the cable modem and host turned on to avoid a lengthy registration process while reducing the likelihood of unauthorized access to the host system.

In another aspect of the present invention, multiple host systems can be coupled to the cable modem. Accordingly, the cable modem can provide a safe mode of operation for each host system coupled to the cable modem. In particular, the data transfer can include an address portion, and each of the host systems can be identified by a respective host address. Data transfers can be addressed to a selected host system using the respective host address. Therefore, data transfers addressed to a first host system can be blocked when the cable modem operates in a first safe mode of operation for the first host system, and data transfers addressed to a second host system can be blocked when the cable modem operates in a second safe mode of operation for the second host system.

In a further aspect of the present invention, the cable modem can include a safe mode button wherein the safe mode of operation is invoked upon pushing the safe mode button. In another embodiment, the safe mode of operation can be invoked after the expiration of a timer that times an interval of inactivity at the host system. In a further embodiment, the cable modem can switch from the safe mode of operation to the normal mode of operation after activity is detected at the host system. In still another embodiment, the mode of operation is invoked on receipt of a command from the host system.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is also described using a flow chart illustration. It will be understood that each block of the flowchart illustration, and combinations of blocks in the flowchart illustration, can be implemented by computer program instructions. These program instructions may be provided to a processor within the cable modem, such that the instructions which execute on the processor create means for implementing the functions specified in the flowchart block or blocks. The computer program instructions may be executed by the processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions. It will be understood that the term "coupled" as used herein to describe arrangements of devices includes arrangements wherein intervening devices are present between the coupled devices. For example, where a first device is described as coupled to a second device, the description will be understood to include other devices located between and coupled to the first and second devices.

Figure 1:
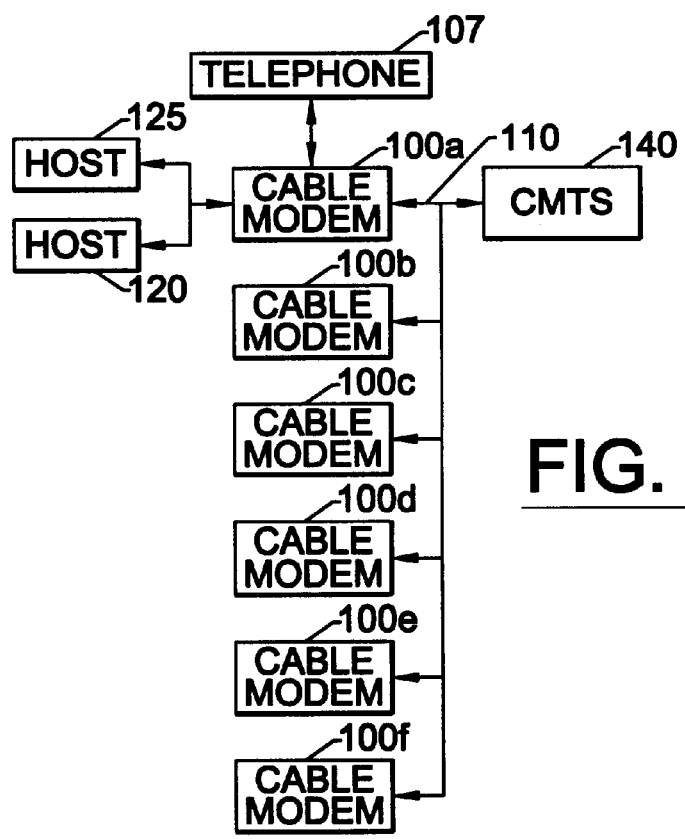
FIG. 1 is a block diagram of an embodiment of a cable system according to the present invention.

FIG. 1 is a block diagram of an embodiment of a cable system according to the present invention. The cable system includes a Cable Modem Termination System or Cable Modem Terminal Server (CMTS) 140 and a plurality of cable modems 100. The CMTS 140 can provide services, such as television service, telephone service, and internet service, to subscribers of the cable system via cable modems 100 by transferring data over a cable 110, such as a coaxial cable. For example, a subscriber may access the Internet through the respective cable modem 100 from a host 125 such as a Personal Computer (PC).

The CMTS 140 manages the services provided to the respective subscribers in the cable system. For example, a first subscriber may receive television, telephone, and Internet services while a second subscriber may receive only Internet service. Moreover, different subscribers may receive a different quality of service. For example, a first subscriber may receive Internet service at relatively low bandwidth while a second subscriber may receive Internet service at relatively high bandwidth. Accordingly, the CMTS 140 transmits and receives data to and from the respective cable modems 100*a–f* at the rates associated with the respective subscribers. The CMTS 140 can also adjust parameters of the cable modems 100*a–f* used to transfer data such as phase timing, frequencies and power levels associated with the transfer of data between the respective cable modems 100*a–f* and the CMTS 140. For example, the CMTS 140 can monitor the timing and power levels of the data transferred from the respective cable modems 100*a–f* and instruct each cable modems 100*a–f* to adjust the timing and power level of the data transfer performed by the cable modems 100*a–f*.

In one embodiment, the Internet service provided by the CMTS 140 includes data transferred between the CMTS 140 and the cable modem 100*a* via the cable 110 at respective frequencies. For example, the subscriber may request information from the Internet, wherein data is transferred from the host 125 through the cable modem 100*a* to the CMTS 140 over the cable 110 at a first frequency. The CMTS 140 responds to the request for information by transferring the requested data from the CMTS 140 to the host 125 through the cable modem 100*a* over the cable 110 at a second frequency. In another embodiment, the request is transmitted via a telephone line which is not part of the cable system.

It will be understood by those of skill in the art, that the data transfers between the CMTS 140 and the cable modem 100*a* may be performed according to standards known in the art. For example, data transfers between the CMTS 140 and the cable modem 100*a* may be performed using a Time Division Multiple Access (TDMA) technique wherein data is transmitted and received over the cable 110 in predefined time-slots. Standards for the transfer of data in cable systems are discussed in the Data Over Cable System Interface Specification (DOCSIS).

When the cable modem 100*a* is turned on, the cable modem 100*a* performs an initialization sequence wherein the cable modem 100*a* registers with the cable system. In particular, the cable modem 100*a* transfers an identifier to the CMTS 140 that identifies the cable modem 100*a* within the cable system. Accordingly, the CMTS 140 can communicate with the selected cable modem 100*a* using the cable modem's respective identifier.

During registration, the CMTS 140 performs ranging of each of the cable modems 100*a–f* registered to adjust for the propagation delay of that data transferred, to adjust the proper power level of the data transfer, and to determine the quality of service provided to the subscriber. If telephone service is provided to the subscriber via the cable system, the registration process can also include the determination of parameters for the telephone service.

After registration, the CMTS 140 provides services to the subscriber via the respective cable modem 100*a*. In operation, services are provided by data transfers between the CMTS 140 and the cable modem 100*a*. In particular, data is transferred from the CMTS 140 to a selected cable modem 100*a* using the identifier that identifies the selected cable modem 100*a* in the cable system. In operation, the data transfer to the selected cable modem 100*a*, includes the identifier which matches the identifier of the selected cable modem 100*a*. For example, if the selected cable modem 100*a* has an associated identifier of 800, a data transfer including an identifier of 800 will be accepted by the selected cable modem 100*a*. A data transfer can include information and/or a command directed to the selected cable modem 100*a*.

Figure 2:
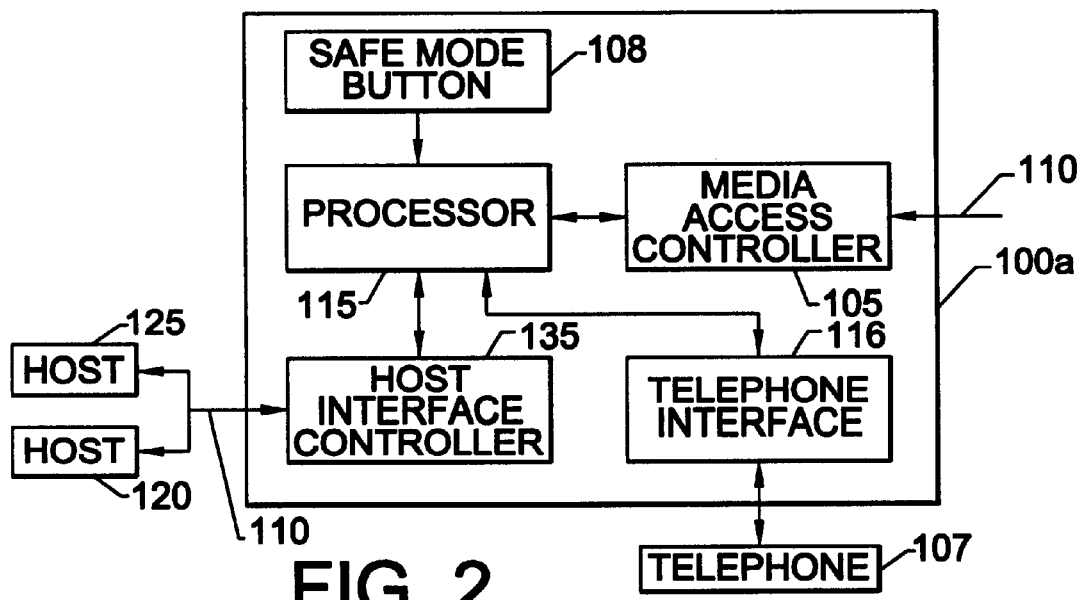
FIG. 2 is a block diagram of an embodiment of the cable modem 100 of FIG. 1.

FIG. 2 is a block diagram of an embodiment of the cable modem 100 of FIG. 1. Data is transferred between the CMTS 140 and the cable modem 100 by a Media Access Controller (MAC) 105 coupled to the cable 110. The MAC 105 accepts data transfers from the CMTS 140 if the identifier included in the data transfer matches the identifier of the cable modem 100. The data transfer can include information intended for a first host 125, a second host 130, a telephone 107, the cable modem 100, or other device accessed via the cable modem 100. For example, the data transfer may include information intended for the first host 125 in response to a request made by the first host 125 or a range command for the cable modem 100 to transfer timed information to the CMTS 140. The functions provided by the MAC 105 may be provided by software running on processor 115 or by hardware and/or software separate from the processor. While the processor, media access controller, host interface controller, and telephone interface controller of FIG. 2 are illustrated as separate blocks, it will be understood that one or more of these portions of the modem or sub-portions thereof, can be implemented using combined hardware and/or software.

The data transfer may include an address specifying which device coupled to the cable modem 100 is the destination of the data transfer. For example, if the data transfer is intended for the second host 130, the address included in the data transfer identifies the second host 130 as the destination. Although not shown, the MAC 105 may be coupled to a Radio Frequency (RF) tuner that modulates and demodulates the data included in the data transfers. For example, data transfers to the CMTS 140 may be modulated and transferred over a first channel on the cable 110. The RF tuner demodulates the data transferred from the CMTS 140 over a second channel on the cable 110.

A processor 115 coordinates operations of the cable modem 100 within the cable system to provide the selected services to the subscriber. According to the present invention, data transfers to addressed hosts are blocked by the processor 115 during a safe mode of operation and not blocked by the processor 115 during a normal mode of operation. Moreover, blocking can be performed on a per host basis. For example, in one embodiment, data transfers addressed to the first host 125 are blocked while data transfers addressed to the second host 130 are received and provided to the second host 130. Moreover, data transfers including commands for the cable modem 100 or addressed to devices other than the hosts are unaffected by the safe mode of operation. For example, a ranging command issued to the cable modem 100 during safe mode of operation is accepted and responded to by the MAC 105.

In one embodiment, the safe or normal mode of operation is selected using software that maintains a safe mode flag that is set to one of a safe mode state or a normal state flag to indicate the selected mode of operation. For example, the flag can be set to the safe mode state to indicate the safe mode of operation and set to the normal mode state to indicate the normal mode of operation. In one embodiment, the mode of operation is selected by pressing a safe mode button 108 on the housing of the cable modem 100*a*. The safe mode button 108 can be a momentary switch that causes the processor 115 to toggle the mode of operation.

In another embodiment, the mode of operation is selected via a command issued by the host. For example, the subscriber may cause a command to be issued to the cable modem 100 whereupon the cable modem 100*a* changes the mode of operation. In still another embodiment, the mode of operation is selected based on a level of activity at the host. For example, the safe mode of operation can be selected after a period of inactivity at the first host 125 is observed over a predetermined time interval. The cable modem 100*a* can resume the normal mode of operation upon the resumption of activity at the first host 125. Accordingly, the mode of operation can be selected based on the subscriber's use of the host coupled to the cable modem 100*a*. Moreover, the cable modem 100*a* need not be located near the subscriber for the mode of operation to be selected. For example, the cable modem 100 may be located in the basement of the subscriber's home while the host is located in the subscriber's home office.

A Host Interface Controller (HIC) 135 provides the data received by the processor 115 to the addressed host and provides data from the host to the processor 115 for transfer to the CMTS 140. The HIC 135 can be a controller suitable for interfacing to at least one host, such as an Ethernet controller, Universal Serial Bus (USB) or other type of interface known to those of skill in the art.

A telephone interface 116 provides telephone data from a telephone 107, such a Data Telephone Equipment (DTE), to the processor 115 and provides data transferred from the CMTS 140 to the telephone 107. As described above, data transfers to the telephone 107 from the CMTS 140 are unaffected by safe mode of operation.

Figure 3:
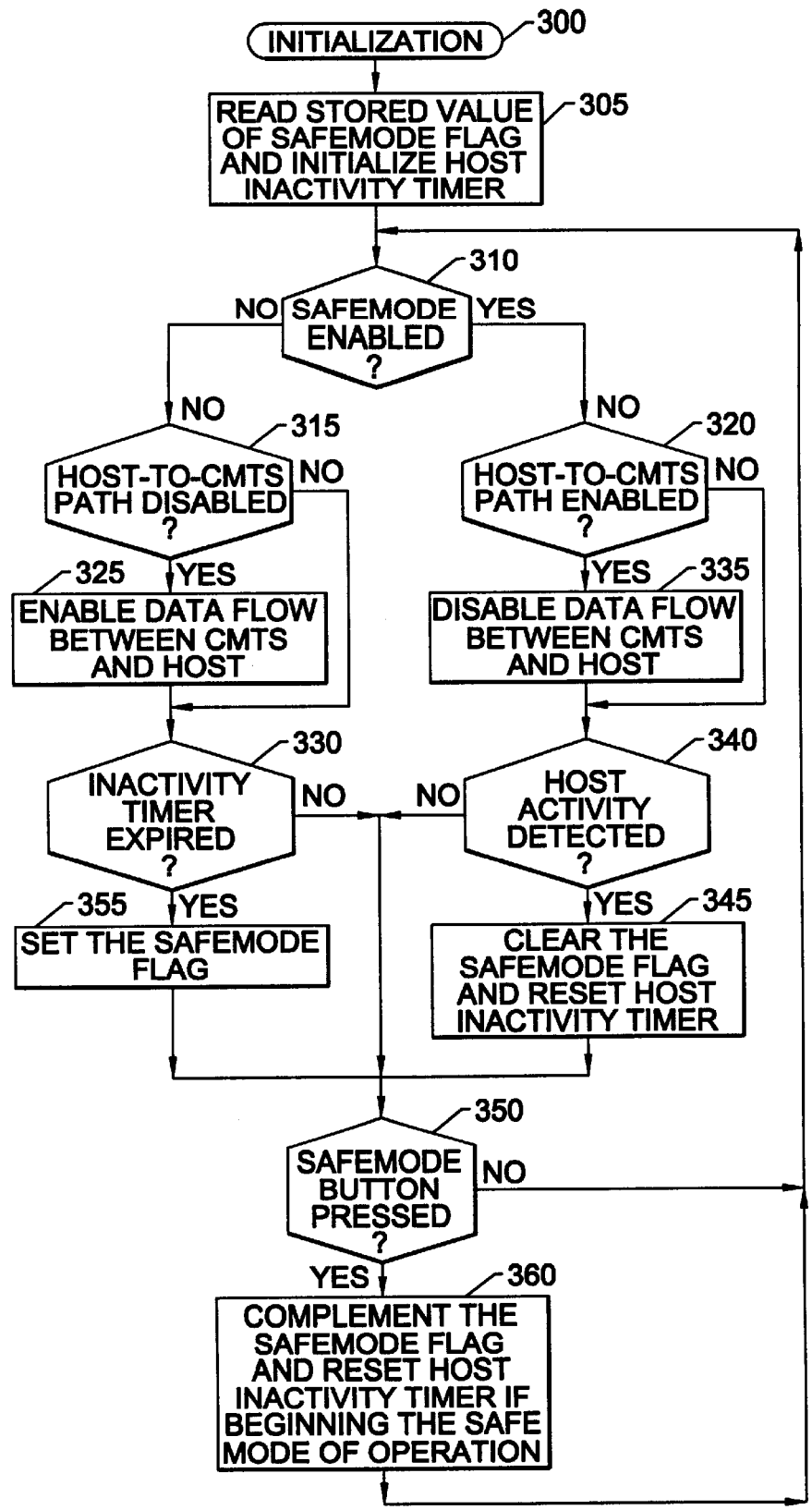
FIG. 3 is a flowchart that illustrates operations of a cable modem according to the present invention.

FIG. 3 is a flowchart illustrating operations of a cable modem 100 according to the present invention. According to FIG. 3, the cable modem 100 performs initialization upon being turned on or reset (block 300). The processor 115 reads the stored value of the safe mode flag to determine which mode of operation is selected (block 305) and resets a host inactivity timer that indicates the elapsed time since host activity was last detected.

If the safe mode flag indicates that safe mode of operation is selected (block 310) for host 115, the processor determines if data transfers from the CMTS 140 to host 125 are currently enabled (block 320). If data transfers are not enabled (block 320) to the host 125, the processor 115 waits for host activity to be detected (block 340) at host 125. Otherwise, if data transfers are currently enabled (block 320) to host 125, the processor 115 disables data transfers (block 335) and then waits for host activity at host 125 to be detected (block 340).

The cable modem 100 continues to operate in the safe mode of operation until host activity is detected at host 125 whereupon the safe mode flag is cleared and the host inactivity timer is reset (block 345), or until a safe mode button is pushed (block 350) thereby changing the safe mode of operation to the normal mode of operation (block 360) and resetting the host inactivity timer.

When the normal mode of operation is enabled (block 310), due to the commencement of activity at the host 125 (block 345) or by pressing the safe mode button (block 360), the processor determines if data transfers from the CMTS 140 are currently disabled (block 315). If data transfers are disabled (block 315), the processor 115 enables data transfers and waits for the host inactivity timer to expire (block 330). Otherwise the processor 115 waits for the host inactivity timer to expire (block 330).

The cable modem 100 continues to operate in the normal mode of operation until the host inactivity timer expires (block 330) whereupon the safe mode flag is set, or until the safe mode button is pushed (block 350) thereby changing the normal mode of operation to safe mode of operation (block 360).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A cable modem that transfers data between a cable system and a host system via a cable, the cable modem comprising:
   a media access controller, coupled to the cable, wherein the media access controller accepts data from the cable system via the cable;
   a processor, coupled to the media access controller, wherein the processor receives the data accepted from the cable system for the host system to provide received host data during a normal mode of operation and wherein the processor blocks data accepted from the cable system for the host system during a safe mode of operation; and
   a host interface, coupled between the processor and the host system, wherein the host interface provides the received host data to the host system during the normal mode of operation.

2. The cable modem of claim 1:
   wherein the host interface is coupled between the processor and a second host system;
   wherein the first and second host systems are identified by respective first and second host addresses;
   wherein the received host data includes an address portion;
   wherein the host interface provides the received host data to the first host system when the address portion of the received host data includes the first host address; and
   wherein the host interface provides the received host data to the second host system when the address portion of the received host data includes the second host address.

3. The cable modem of claim 2, wherein the processor blocks data accepted from the cable system for both the first and second host systems during the safe mode of operation.

4. The cable modem of claim 2 wherein the safe mode of operation comprises a first safe mode of operation for the first host system and a second safe mode of operation for the second host system, wherein data accepted from the cable system addressed to the first host system is blocked during the first safe mode of operation for the first host system, and wherein data accepted from the cable system addressed to the second host system is blocked during the second safe mode of operation for the second host system.

5. The cable modem of claim 1 further comprising:
   a cable modem housing; and
   a safe mode button, wherein the safe mode of operation is invoked upon pressing the safe mode button.

6. The cable modem of claim 1, wherein the processor invokes the safe mode of operation after expiration of a time interval during which no activity is detected at the host system.

7. The cable modem of claim 1, wherein the processor invokes the normal mode of operation after detecting activity at the host system.

8. The cable modem of claim 1, wherein the safe mode of operation is invoked on receipt of a safe mode command from the host system.

9. The cable modem of claim 1, wherein the processor includes a safe mode flag that can be set by the processor to one of a safe mode state and a normal mode state, wherein the safe mode of operation is invoked when the safe mode flag is set to the safe mode state.

10. The cable modem of claim 9, wherein the media access controller processes addresses included in the data during the safe mode of operation and during the normal mode of operation, wherein the cable modem further comprises:
    a telephone interface, coupled to the processor, wherein the telephone interface provides telephone data external to the cable modem during the safe mode of operation and during the normal mode.

11. A method of transferring data between a cable system and a first host system, the method comprising the steps of:
    accepting data from the cable system;
    receiving the data accepted from the cable system for the host system to provide received host data during a normal mode of operation;
    blocking the data accepted from the cable system for the host system during a safe mode of operation; and
    providing the received host data to the first host system during the normal mode of operation.

12. The method of claim 11, wherein the data is transferred between the cable system, the first host system, and a second host system, wherein the first and second host systems are identified by respective first and second host addresses, and wherein the received host data includes an address portion, wherein the step of providing comprise the steps of:
    providing the received host data to the first host system when the address portion of the received host data includes the first host address; and
    providing the received host data to the second host system when the address portion of the received host data includes the second host address.

13. The method of claim 12, wherein the step of blocking comprises the step of blocking data accepted from the cable system addressed to both the first and second host systems during the safe mode of operation.

14. The method of claim 12, wherein the safe mode of operation comprises a first safe mode of operation for the first host system and a second safe mode of operation for the second host system, wherein the step of blocking comprises the step of blocking the data accepted from the cable system addressed to the first host system during the first safe mode of operation for the first host system and blocking the data accepted from the cable system addressed to the second host system during the second safe mode of operation for the second host system.

15. The method claim 11, wherein the safe mode of operation is invoked upon detecting activation of a safe mode button.

16. The method of claim 11, wherein the step of blocking comprises the step of invoking the safe mode of operation after expiration of a time interval during which no activity at the first host system is detected.

17. The method of claim 11, wherein the step of providing comprises the step of invoking the normal mode of operation after detecting activity at the first host system.

18. The method of claim 11, wherein the step of blocking comprises the step of blocking the data accepted from the cable system during the safe mode of operation, wherein the safe mode of operation is invoked on receipt of a safe mode command from the first host system.

19. The method of claim 11, wherein a safe mode flag is set to a safe mode state to indicate that the safe mode of operation is enabled or to a normal mode state to indicate that the normal mode of operation is enabled.

20. A cable modem that transfers data between a cable system and a first host system via a cable, the cable modem comprising:

means for accepting data from the cable system;

means for receiving the data accepted from the cable system to provide received host data during a normal mode of operation;

means for blocking the data accepted from the cable system during a safe mode of operation; and means for providing the received host data to the first host system during the normal mode of operation.

21. The cable modem of claim 20, wherein the data is transferred between the cable system, the first host system, and a second host system, wherein the first and second host systems are identified by respective first and second host addresses, wherein the received host data includes an address portion, wherein the means for providing comprises:

means for providing the received host data to the first host system when the address portion of the received host data includes the first host address; and means for providing the received host data to the second host system when the address portion of the received host data includes the second host address.

22. The cable modem of claim 21, wherein the means for blocking comprises means for blocking data accepted from the cable system addressed to both the first and second host systems during the safe mode of operation.

23. The cable modem of claim 21, wherein the safe mode of operation comprises a first safe mode of operation for the first host system and a second safe mode of operation for the second host system, wherein the means for blocking comprises means for blocking the data accepted from the cable system addressed to the first host system during the first safe mode of operation for the first host system and means for blocking the data accepted from the cable system addressed to the second host system during the second safe mode of operation for the second host system.

24. The cable modem claim 20, wherein the means for blocking comprises a safe mode button, wherein the safe mode of operation is invoked upon pressing the safe mode button.

25. The cable modem of claim 20, wherein the means for blocking comprises means for invoking the safe mode of operation after expiration of a time interval during which no activity at the first host system is detected.

26. The cable modem of claim 20, wherein means for providing comprises means for invoking the normal mode of operation after detecting activity at the first host system.

27. The cable modem of claim 20, wherein the means for blocking comprises means for blocking the data accepted from the cable system during the safe mode of operation, wherein the safe mode of operation is invoked on receipt of a safe mode command from the first host system.

28. The cable modem of claim 20, wherein a safe mode flag is set to indicate that the safe mode of operation is enabled and is cleared to indicate that the normal mode of operation is enabled.

29. A modem that transfers data between a central system and a host system via a transmission medium, the modem comprising:

a media access controller, coupled to the transmission medium, wherein the media access controller accepts data from the central system via the transmission medium;

a processor, coupled to the media access controller, wherein the processor receives the data accepted from the central system for the host system to provide received host data during a normal mode of operation and wherein the processor blocks data accepted from the central system for the host system during a safe mode of operation; and a host interface, coupled between the processor and the host system, wherein the host interface provides the received host data to the host system during the normal mode of operation.

30. The modem of claim 29:

wherein the host interface is coupled between the processor and a second host system;

wherein the first and second host systems are identified by respective first and second host addresses;

wherein the received host data includes an address portion;

wherein the host interface provides the received host data to the first host system when the address portion of the received host data includes the first host address; and wherein the host interface provides the received host data to the second host system when the address portion of the received host data includes the second host address.

31. The modem of claim 30, wherein the processor blocks data accepted from the central system for both the first and second host systems during the safe mode of operation.

32. The modem of claim 30, wherein the safe mode of operation comprises a first safe mode of operation for the first host system and a second safe mode of operation for the second host system, wherein data accepted from the central system addressed to the first host system is blocked during the first safe mode of operation for the first host system, and wherein data accepted from the central system addressed to the second host system is blocked during the second safe mode of operation for the second host system.

33. The modem of claim 29, further comprising:

a modem housing; and a safe mode button, wherein the safe mode of operation is invoked upon pressing the safe mode button.

34. The modem of claim 29, wherein the processor invokes the safe mode of operation after expiration of a time interval during which no activity is detected at the host system.

35. The modem of claim 29, wherein the processor invokes the normal mode of operation after detecting activity at the host system.

36. The modem of claim 29, wherein the safe mode of operation is invoked on receipt of a safe mode command from the host system.

37. The modem of claim 29, wherein the processor includes a safe mode flag that can be set by the processor to one of a safe mode state and a normal mode state, wherein the safe mode of operation is invoked when the safe mode flag is set to the safe mode state.

38. The modem of claim 37, wherein the media access controller processes addresses included in the data during the safe mode of operation and during the normal mode of operation, wherein the modem further comprises:

a telephone interface, coupled to the processor, wherein the telephone interface provides telephone data external to the modem during the safe mode of operation and during the normal mode.

39. A method of transferring data between a central system and a first host system, the method comprising the steps of:

accepting data from the central system;

receiving the data accepted from the central system for the host system to provide received host data during a normal mode of operation;

blocking the data accepted from the central system for the host system during a safe mode of operation; and providing the received host data to the first host system during the normal mode of operation.

40. The method of claim 39, wherein the data is transferred between the central system, the first host system, and a second host system, wherein the first and second host systems are identified by respective first and second host addresses, and wherein the received host data includes an address portion, wherein the step of providing comprise the steps of:

providing the received host data to the first host system when the address portion of the received host data includes the first host address; and providing the received host data to the second host system when the address portion of the received host data includes the second host address.

41. The method of claim 40, wherein the step of blocking comprises the step of blocking data accepted from the central system addressed to both the first and second host systems during the safe mode of operation.

42. The method of claim 40, wherein the safe mode of operation comprises a first safe mode of operation for the first host system and a second safe mode of operation for the second host system, wherein the step of blocking comprises the step of blocking the data accepted from the central system addressed to the first host system during the first safe mode of operation for the first host system and blocking the data accepted from the central system addressed to the second host system during the second safe mode of operation for the second host system.

43. The method claim 39, wherein the safe mode of operation is invoked upon detecting activation of a safe mode button.

44. The method of claim 39, wherein the step of blocking comprises the step of invoking the safe mode of operation after expiration of a time interval during which no activity at the first host system is detected.

45. The method of claim 39, wherein the step of providing comprises the step of invoking the normal mode of operation after detecting activity at the first host system.

46. The method of claim 39, wherein the step of blocking comprises the step of blocking the data accepted from the central system during the safe mode of operation, wherein the safe mode of operation is invoked on receipt of a safe mode command from the first host system.

47. The method of claim 39, wherein a safe mode flag is set to a safe mode state to indicate that the safe mode of operation is enabled or to a normal mode state to indicate that the normal mode of operation is enabled.

48. A modem that transfers data between a central system and a first host system via a transmission medium, the modem comprising:

means for accepting data from the central system;

means for receiving the data accepted from the central system to provide received host data during a normal mode of operation;

means for blocking the data accepted from the central system during a safe mode of operation; and means for providing the received host data to the first host system during the normal mode of operation.

49. The modem of claim 48, wherein the data is transferred between the central system, the first host system, and a second host system, wherein the first and second host systems are identified by respective first and second host addresses, wherein the received host data includes an address portion, wherein the means for providing comprises:

means for providing the received host data to the first host system when the address portion of the received host data includes the first host address; and means for providing the received host data to the second host system when the address portion of the received host data includes the second host address.

50. The modem of claim 49, wherein the means for blocking comprises means for blocking data accepted from the central system addressed to both the first and second host systems during the safe mode of operation.

51. The modem of claim 49, wherein the safe mode of operation comprises a first safe mode of operation for the first host system and a second safe mode of operation for the second host system, wherein the means for blocking comprises means for blocking the data accepted from the central system addressed to the first host system during the first safe mode of operation for the first host system and means for blocking the data accepted from the central system addressed to the second host system during the second safe mode of operation for the second host system.

52. The modem claim 48, wherein the means for blocking comprises a safe mode button, wherein the safe mode of operation is invoked upon pressing the safe mode button.

53. The modem of claim 48, wherein the means for blocking comprises means for invoking the safe mode of operation after expiration of a time interval during which no activity at the first host system is detected.

54. The modem of claim 48, wherein means for providing comprises means for invoking the normal mode of operation after detecting activity at the first host system.

55. The modem of claim 48, wherein the means for blocking comprises means for blocking the data accepted from the central system during the safe mode of operation, wherein the safe mode of operation is invoked on receipt of a safe mode command from the first host system.

56. The modem of claim 48, wherein a safe mode flag is set to indicate that the safe mode of operation is enabled and is cleared to indicate that the normal mode of operation is enabled.

* * * * *